United States Patent
Goi et al.

(10) Patent No.: US 8,500,583 B2
(45) Date of Patent: Aug. 6, 2013

(54) AIRCRAFT STARTER GENERATOR

(75) Inventors: Tatsuhiko Goi, Kobe (JP); Kenichiro Tanaka, Kobe (JP); Koji Watanabe, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 430 days.

(21) Appl. No.: 12/916,898

(22) Filed: Nov. 1, 2010

(65) Prior Publication Data

US 2011/0101693 A1    May 5, 2011

(30) Foreign Application Priority Data

Nov. 4, 2009   (JP) ................... 2009-253400
Jun. 23, 2010  (JP) ................... 2010-142267

(51) Int. Cl.
*F16H 3/72* (2006.01)
*F16H 37/08* (2006.01)

(52) U.S. Cl.
USPC ............................................................ 475/5

(58) Field of Classification Search
USPC .................... 475/198, 207, 210, 5
See application file for complete search history.

(56) References Cited

U.S. PATENT DOCUMENTS

| | | | |
|---|---|---|---|
| 3,274,855 A | 9/1966 | Reynolds et al. | |
| 3,786,696 A | 1/1974 | Aleem | |
| 4,315,442 A | 2/1982 | Cordner | |
| 5,890,468 A * | 4/1999 | Ozawa | 123/561 |
| 6,393,355 B1 | 5/2002 | Muramatsu | |
| 8,146,370 B2 * | 4/2012 | Zeiner et al. | 60/792 |
| 8,261,550 B2 * | 9/2012 | Sartre | 60/607 |
| 2008/0072568 A1 | 3/2008 | Moniz et al. | |
| 2010/0200692 A1 | 8/2010 | Goi et al. | |
| 2012/0108390 A1 * | 5/2012 | Doihara et al. | 477/46 |

FOREIGN PATENT DOCUMENTS

| | | |
|---|---|---|
| GB | 1199145 | 7/1970 |
| JP | A-49-68136 | 7/1974 |
| JP | A-1-500845 | 3/1989 |
| JP | A-2001-107749 | 4/2001 |
| JP | A-2008-38902 | 2/2008 |
| JP | A-2008-82335 | 4/2008 |
| JP | A-2009-26220 | 2/2009 |
| JP | A-2010-179815 | 8/2010 |
| WO | WO 88/01689 | 3/1988 |

OTHER PUBLICATIONS

Japanese Office Action dated Nov. 1, 2011 issued in Japanese Application No. 2010-142267 (with English translation).

* cited by examiner

*Primary Examiner* — Justin Holmes
(74) *Attorney, Agent, or Firm* — Oliff & Berridge, PLC (57) ABSTRACT

A starter generator has an electric rotating machine having a rotating shaft and designed to carry two reverse operations—motor and generator. A first clutch is connected between the rotating machine and the first rotating shaft for transmitting rotations of the rotating machine to the first rotating shaft. A second clutch is connected between the rotating machine and the second rotating shaft for transmitting rotations of the second rotating shaft to the rotating machine. A continuously variable transmission is provided for changing the number of rotations transmitted from the second rotating shaft to the rotating machine. The rotating machine is supplied with electric power to rotate the rotating shaft, or the number of rotations of the rotating shaft is kept constant by controlling a transmission ratio of the continuously variable transmission.

9 Claims, 8 Drawing Sheets

AIRCRAFT STARTER GENERATOR

FIELD OF THE INVENTION

The present invention relates to an aircraft starter generator which is drivingly connected to an aircraft engine to carry on two reverse operations—engine starter (motor) and generator.

BACKGROUND OF THE INVENTION

Conventionally, the aircraft starter generator is driven by a high-pressure rotating shaft of the two-shaft jet engine. Disadvantageously, this fails to accommodate an increase of electric power to be supplied to a huge number of electronic devices newly installed in the aircraft, which results in a higher risk for engine stall at lower output operations of the engine such as ground idling or descending flight. In addition, a future higher bypass ratio of the engine will increase that risk which may not be eliminated by the conventional constant frequency (CF) or variable frequency (VF) integrated drive generator (IDG) which incorporates a continuously variable transmission allowing to generate electric power with a constant frequency irrespective of the rotation number of the engine. To cope with this, there has been proposed a constant frequency (CF) integrated drive generator (IDG) using a traction drive continuously variable transmission, which is expected to meet the requirements for introduction of electronic components into the aircraft (see Japanese Patent Application No. 2009-026220.)

Another key technology is the electric starter which may be replaced by the conventional air compressor starter. The electric starter, because it can be used as a power generator after the engine is started, will contribute to its weight and cost saving. However, since the compressor is driven by the high-pressure shaft, the starter generator is required to be connected to the high-pressure shaft in order to start the engine, which may result in the engine stall. Also, the electric power generated by the generator has a variable frequency.

In addition, JP (A) 2008-38902, the U.S. Pat. Nos. 3,274,855, 3,786,696, 4,315,442, and UK Patent No. 1199145 disclose to modify the conventional IDG to work as a starter generator drivingly connected to the high-pressure rotating shaft, rather than the low-pressure rotating shaft.

Further, in order to use more electronic components in the aircraft in place of mechanical components, it has been proposed to use a starter generator driven by the high-pressure rotating shaft and an integrated drive generator driven by the low-pressure rotating shaft. This requires two different systems, i.e., variable frequency and constant frequency systems, which results in a complexity of the power system of the aircraft, an increase the number of spare parts, and an increase of its production cost.

Another technique may be employed to modify the integrated drive generator and connect it to the high-pressure rotating shaft. However, this requires the traction drive to transmit a large torque at the start of the engine, which may cause unwanted heat-fusing and/or metallic fatigue in the contact surfaces of the traction drive.

Accordingly, the present invention is to provide an aircraft starter generator in which an electric power with constant frequency is generated and a starter operation is carried out by the use of the high-pressure rotating shaft, which simplifies the structure of the apparatus and attains a cost reduction of the starter generator.

SUMMARY OF THE INVENTION

In order to achieve the foregoing object, the present invention provides a starter generator for use with an engine. The engine has a compressor for compressing air, a combustor for combusting fuel with the air compressed by the compressor, first and second turbines adapted to be rotated by impingements of compressed combustion gases from the combustor, a first rotating shaft drivingly connected with the compressor and the first turbine so that it rotates with the compressor and the first turbine, and a second rotating shaft drivingly connected with the second turbine so that it rotates with the second turbine.

The invention is featured in that the starter generator has
an electric rotating machine having a rotating shaft, the rotating machine being designed to carry on two reverse operations—motor and generator;
a first clutch connected between the rotating machine and the first rotating shaft for transmitting rotations of the rotating machine to the first rotating shaft;
a second clutch connected between the rotating machine and the second rotating shaft for transmitting rotations of the second rotating shaft to the rotating machine;
a continuously variable transmission for changing the number of rotations transmitted from the second rotating shaft to the rotating machine; and
a control designed to carry our a first mode in which the rotating machine is supplied with electric power to rotate the rotating shaft and thereby rotations of the rotating shaft are transmitted through the first clutch to the first rotating shaft and a second mode in which, following the first mode, the number of rotations of the rotating shaft of the rotating machine is kept constant by controlling a transmission ratio of the continuously variable transmission.

According to the invention, the electric power generation of a constant frequency and the starting operation of the engine are carried out by the single rotating machine, which simplifies the structure of the starter generator and reduces its production cost. Also, when starting the engine, no load is transmitted to the rotating machine, which reduces an electric power needed for staring the engine.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following descriptions of the preferred embodiments are merely exemplary in nature and are in no way intended to limit the invention, its application, or uses.

Figure 1:
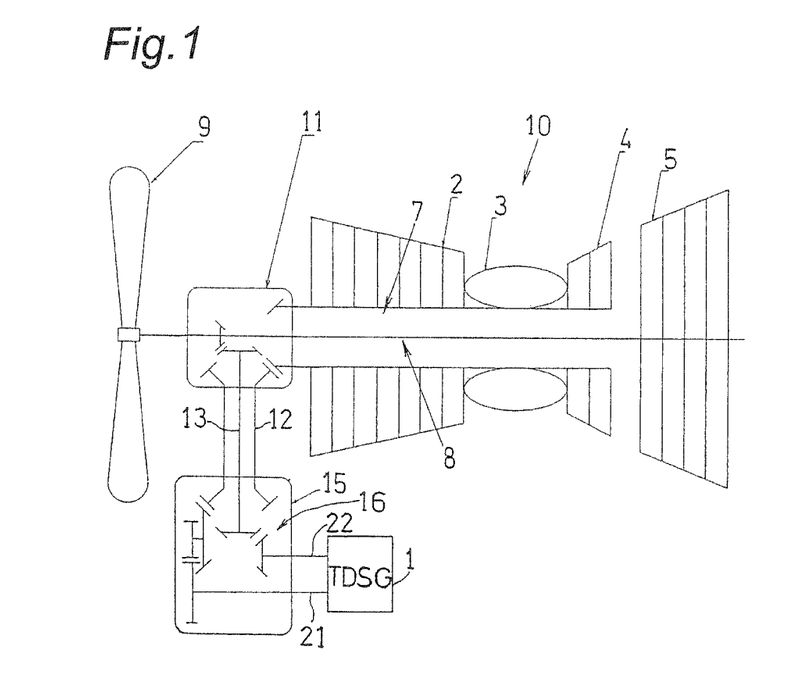
FIG. 1 is a schematic cross sectional view showing an aircraft engine and a starter generator drivingly connected to the engine, according to an embodiment of the invention.

FIG. 1 shows an aircraft engine generally indicated by reference numeral 10. As indicated in the drawing, the engine 10 is a gas turbine incorporated in the aircraft jet engine. In the exemplary embodiment, the engine is a two-shaft turbo fan engine and has a compressor 2, a plurality of combustors 3, a high-pressure turbine 4 and a low-pressure turbine 5. The high-pressure turbine 4 is drivingly connected to the compressor 2 through a first rotating shaft or high-pressure shaft 7 to drive the compressor 2. The low-pressure turbine 4, which is used to transmit drive power to a load, is connected to a fan 9 through a second rotating shaft or low-pressure shaft 8 for rotating the fan.

The high- and low-pressure shafts, 7 and 8, are connected through a gear train, generally indicated by reference numeral 11, to high- and low-pressure transmission shafts, 12 and 13, respectively. The shafts 12 and 13 are in turn connected through another gear train 16 accommodated in a gear box 15 to high- and low-pressure rotating shafts 21 and 22, respectively. The shafts 21 and 22 are connected to a starter generator according to the invention, generally indicated by reference numeral 1.

Figure 2:
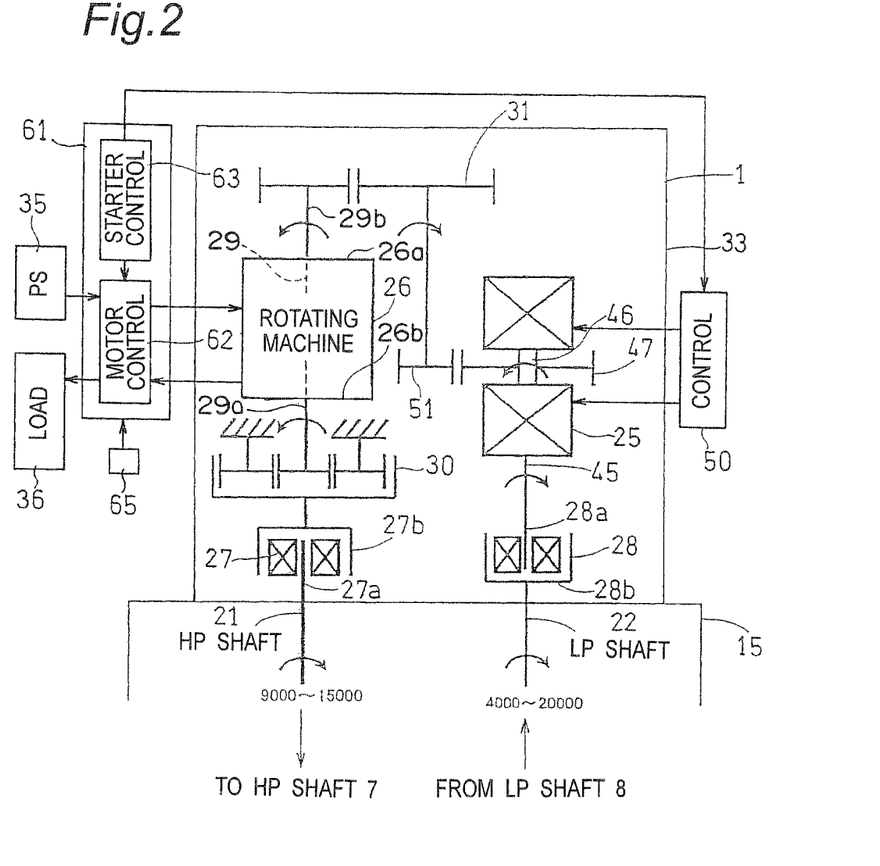
FIG. 2 is a schematic cross sectional view of the aircraft starter generator shown in FIG. 1.

1: The starter generator 1, which is embodied in the form of a traction drive starter generator in the exemplary embodiment, is used as an auxiliary apparatus for the aircraft engine 10. The starter generator 1 has a variety of major components, such as a traction-drive continuously variable transmission 25, an electric rotating machine 26, two one-way clutches 27 and 28, shafts 21 and 22, first and second gear trains 30 and 31 for drivingly connecting between the rotating machine 26 and the first clutch 27 and the rotating machine 26 and the transmission 25, respectively, and a housing 33 accommodating those components. The housing 33 is securely connected to the gear box 15 by suitable fasteners such as bolts not shown. The rotating machine 26 has a rotating shaft 29. The opposite ends of the rotating shaft 29 are projected from opposite walls thereof 26a and 26b and connected at its one end 29a with a first gear train or speed-up gear train 30 and at its the other end with a second gear train or idler gear train 31. This arrangement, in which the speed-up gear train 30 and the idler gear train 31 are provided on opposite sides of the rotating machine 26 as described above, allows a limited space within the housing 31 to be used so efficiently.

The speed-up gear train 30 is provided between the rotating machine 26 and the high-pressure clutch 27 and the idler gear train 31 is provided between the rotating machine 26 and the continuously variable transmission 25. The transmission 25 is in turn connected to the low-pressure clutch 28.

Figure 4:
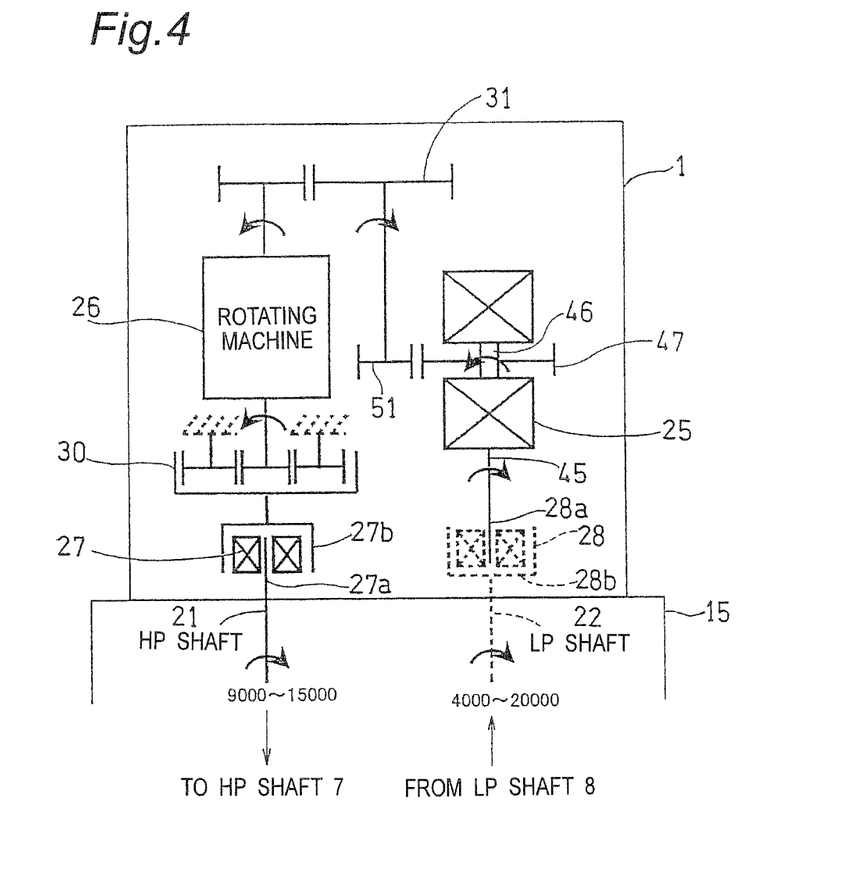
FIG. 4 is a schematic cross sectional view of the aircraft starter generator in the starter mode.
Figure 5:
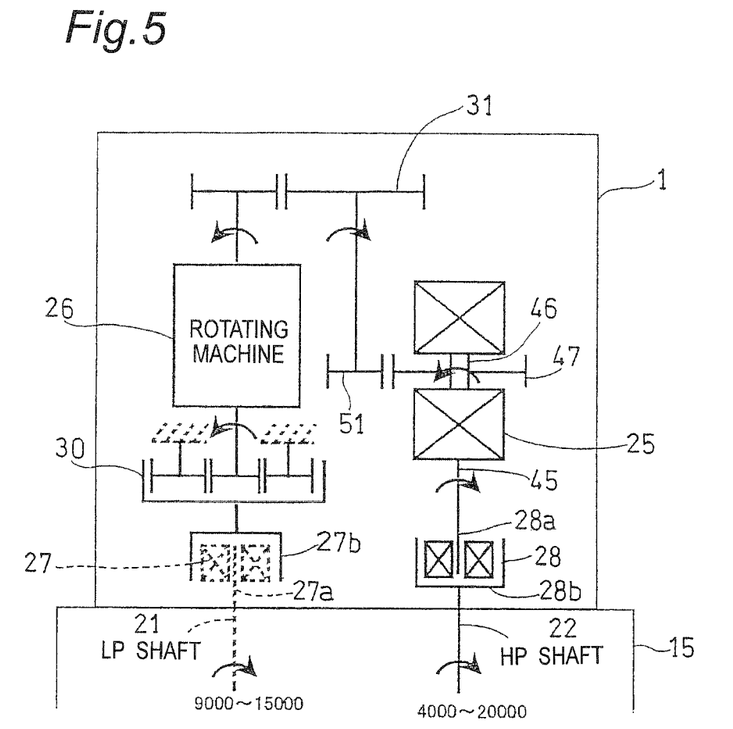
FIG. 5 is a schematic cross sectional view of the aircraft starter generator in the generation mode.

2: The high-pressure (HP) shaft 21 connected to the high pressure shaft 7 of the engine 10 is drivingly connected to an inner race 27a of the high-pressure one-way clutch 27 which is preferably made of sprag- or roller-type clutch. The high-pressure one-way clutch (herein after referred to as "HP clutch") 27 is so designed that, as shown in FIG. 5, after the engine enters into a self-sustained operation and then the rotation number exceeds a certain value, the inner race 27a becomes to rotate or idle independently while no rotational power is transmitted from the outer race 27b to the inner race 28a. The low-pressure shaft (hereinafter referred to as "LP shaft") 22 connected to the low-pressure shaft 8 of the engine 10 is connected to the outer race 28b of the low-pressure one-way clutch 28. The low-pressure one-way clutch (hereinafter referred to as "LP clutch") 28 is so designed that, when the rotation number of the engine is lower than a predetermined value during, for example, the start operation, namely, the rotation number of the inner race 28a is less than that of the outer race 28b, the inner race 28a rotates or idle independently while no rotational power is transmitted from the outer race 28b to the inner race 28a as shown in FIG. 4. The outer race 27ab of the HP clutch 27 is connected to one end 29a of the rotational shaft 29 through a speed-up gear train 30.

3: The starter generator 1 has a start control 61. The start control 61 is provided to control a start operation of the engine 10 and, for this purpose, includes a motor control circuit 62 and a starter control circuit 63. The motor control circuit 62 is so designed that, at starter mode, it controls electric power from the power source 35 such as an external power unit or auxiliary power unit (APU) incorporated in the aircraft not shown and supplies the controlled electric power to the rotating machine 26 and, at power generation mode, it controls the electric power generated by the rotating unit and supplies the controlled electric power to external load or loads 36. The starter control circuit 63 is so designed that it controls the motor control circuit 62 according to the rotation number of the high-pressure shaft which is detected by a sensor 65 and, at the start mode, it energizes the engine 10 by increasing the rotation number of the rotating machine 26 according to a predetermined rotation number increasing pattern.

4: When starting the engine, the electric power is supplied from the power source 35 to the rotating machine 26 which operates as a starter motor to rotate the HP shaft 7 of the engine 10 through the HP shaft 21 for starting the engine 10. When it is detected from the output signal from the sensor 65 that the rotation number of the HP shaft 7 reaches the predetermined number, the rotating machine 26 is disconnected from the power source 35 by the motor control circuit 62, which results in that the rotation number of the motor machine 26 decreases gradually and then comes to a halt eventually (starter cutoff operation). The engine 10 continues to drive by itself without any aid from the power source while increasing the rotation number of the HP shaft 7. Then, the rotation number of the inner race 27a becomes greater than that of the outer race 27b, which causes the inner race 27a to be disconnected from the outer race 27b.

5: With the increase of the rotation number of the engine 1, or the HP shaft 7, the rotation number of the LP shaft (fan shaft) 8 begins to increase. As described above, the LP shaft 22 is connected to the outer race 28b of the LP clutch 28. Also, the rotational shaft 26 is connected through the idler gear train 28 and the traction-drive continuously variable transmission 25 to the inner race 28a of the LP clutch 28. This results in that the idler gear train 31 is connected to the output of the traction-drive transmission 25 and the input of the transmission is connected to the inner race 28a of the clutch 28. In this state, since the rotation number of the outer race 28b is greater than that of the inner race 28a, the LP clutch 28 is in the disconnected state.

6: After the starter cutoff operation, the rotation number of the inner race 28a of the LP clutch 28 decreases in proportion to that of the rotating machine 26. On the other hand, the rotation number of the outer race 28b of the LP clutch 28 increases. Then, when the rotation number of the inner race 28a becomes less than that of the outer race 28b, the LP clutch enters the connected state in which the rotations of the LP shaft 8 in the engine 10 is transmitted to the rotating machine 26.

Figure 3:
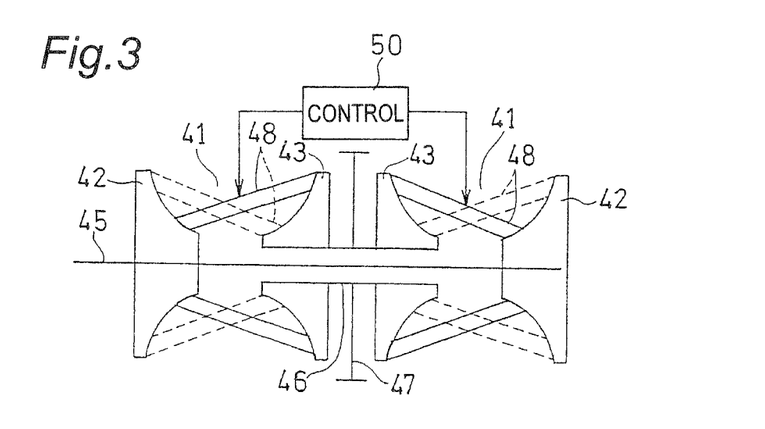
FIG. 3 is a schematic cross sectional view of a traction drive incorporated in the starter generator shown in FIG. 2.

7: At this moment, as shown in FIG. 3, the traction-drive transmission 25 is set to be the maximum speed-down mode in which a transmission rate of output relative to input takes the lowest, by the control 50 according to instructions from the starter control circuit 63. Hereinafter, a sequence of operations discussed at 5-7 is referred to as "transient mode".

The double-cavity traction-drive transmission 25 has two cavities in each of which input and output disks 42 and 43 are provided outside and inside thereof, respectively, to oppose each other in the axial direction. The input disks 42 are connected to an input shaft 45 and the output disks 43 are connected to an output shaft 46. The associated input and output disks 42 and 43 are rotatably connected by one or more power rollers 48 provided therebetween which transmit rotations from the input disk to the output disk by the use of friction of lubricant. The power rollers 48 are provided at certain intervals around the input shaft 45. The output shaft 46 is connected to an output gear 47 which in turn is connected to an intermediate gear 51 drivingly connected to the idler gear train 31 in FIG. 1. The positions of the power rollers 48 are controlled by the controller 50 to thereby change the velocity ratio between input and output disks 42 and 43. For example, at the maximum speed-up mode, the power rollers 48 take respective positions shown by dotted lines in FIG. 3.

8: If the rotational speed of the LP shaft of the engine 10 reaches the ground idle (maneuvering on the ground), a speed control by the transmission 25 in FIG. 2 is initiated in which the control 50 controls the rotational speed of the output shaft 47 of the transmission 25 to maintain the rotational speed of the rotating machine 26 constant (for example, 24,000 rpm) irrespective of the rotational speed of the LP shaft 8. Then, if the rotational speed of the rotating machine 26 reaches a predetermined, a power generation is started to supply an alternating current power of a constant frequency (for example, 400 Hz for two magnetic-pole generator) for external electric load 36 or loads (generator mode) irrespective of the rotational speed of the LP shaft 22. In this mode, since the gear ratio of the speed-up gear train 30 is so designed that the outer race of the HP clutch 27 always takes lower rotational speed than the inner race thereof, the HP clutch 27 transmits the rotational power from the outer race 27b to the inner race 27a. This means the starter generator 1 is driven by the LP shaft 8, not by the HP shaft 7.

Referring next to FIGS. 4 and 5, discussions will be made to the operations of the starter generator 1. In those drawings, the transmission 25 is disconnected from the rotating machine 26 as shown by dotted lines.

When staring the engine (starter mode) as shown in FIG. 4, the rotating machine 26 rotates the HP shaft 7 only. During this operation, the LP shaft 8 runs idling so that no driving power is transmitted to the LP shaft 8. This means that the LP shaft 8 does not suffer from load which would otherwise be caused for staring rotations of the fan 9 connected to the LP shaft 8, which significantly reduces electric power needed in the starting operation.

Once the engine is self-sustained, as shown in FIG. 5, the driving force is transmitted to the rotating machine 26 through the LP shaft 22, the LP clutch 28, the transmission 25, and the idler gear train 31 (generator mode). During this mode, the HP clutch 27 runs idle and therefore no rotational force is transmitted simultaneously from the LP shaft 21, which prevents an interference of rotation powers. To achieve this mode, for example, gear ratios each defined as a ratio of the speed of rotation of the powered gear positioned adjacent to the shaft 21 to that of the driven gear away from the shaft 21 are set to be as follows:
(a) the speed-up gear train 31 has a gear ratio of 1:3 (although the gear train 31 is a planetary gear train it may be another gear train);
(b) the idler gear train 31 has a gear ratio of 1.34:1 (speed-down);
(c) the gear ratio between the intermediate gear 51 and the transmission output gear 47 is 2:1 (speed-down); and
(d) the gear ratio of transmission 25 ranges $1/5^{1/2}$ (speed-down) to $5^{1/2}/1$ (speed-up) (total gear ratio is 1:5).

To carry out the above-described embodiment, the transmission gear ratio of the transmission 25 is fixed to be in the maximum speed-down mode by the starter control circuit 63, i.e., Lo-mode, in which the output gear 47 takes the gear ratio of $1/5^{1/2}$ when viewed from the shaft 21 (indicated by solid lines in FIG. 3), during the starter mode, i.e., before the start of the transmission control in the transient mode.

Figure 6:
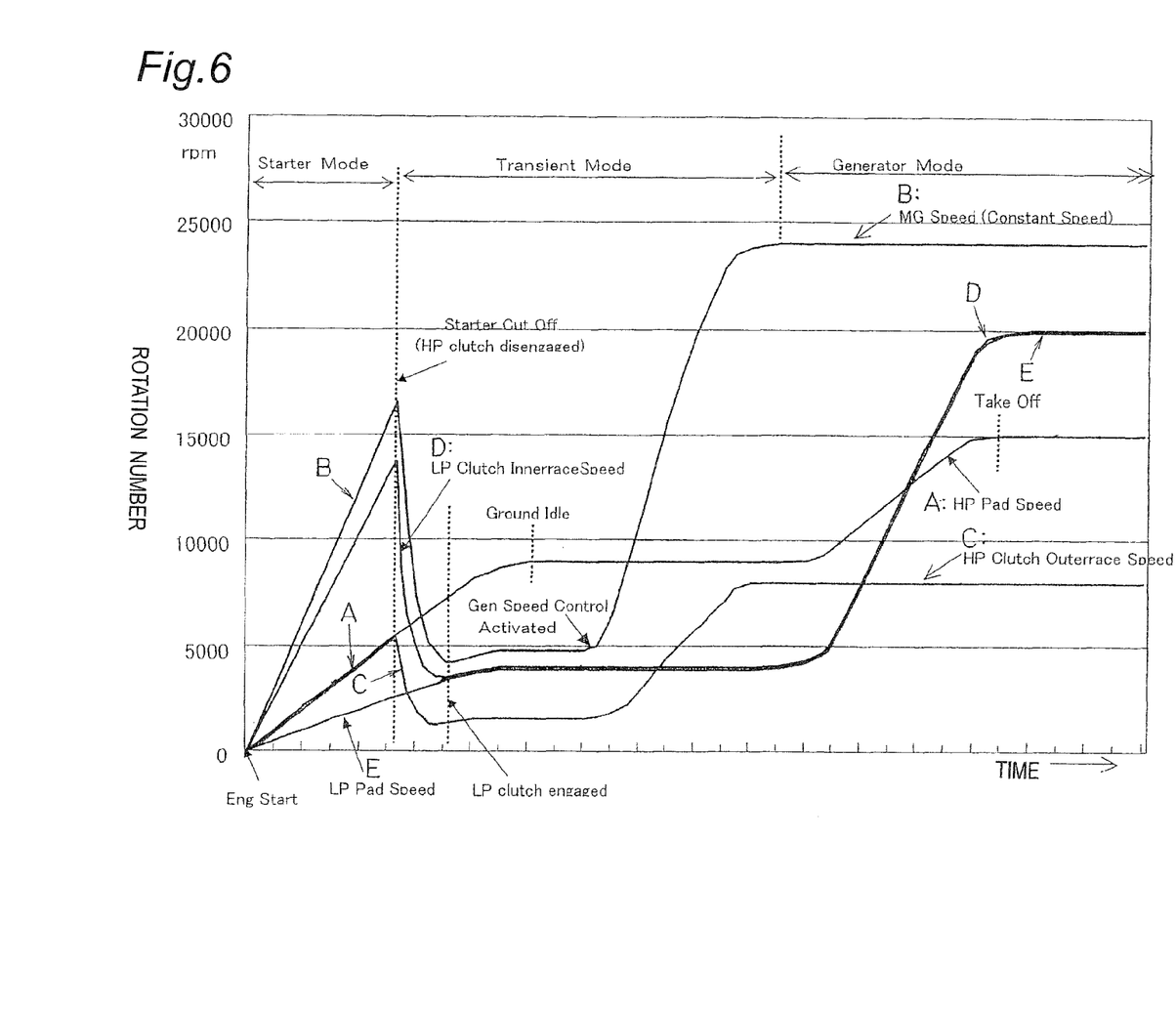
FIG. 6 is a graph showing a time versus rotation number relationship of each rotating members in the aircraft starter generator.

FIG. 6 shows an example of a time versus rotation number relationship of each shaft shown in FIG. 2. This graph indicates the followings:

(a) In the starter mode, the motor control circuit 62 is driven by the instructions from the starter control circuit 63 in FIG. 2, which energizes the rotating machine 26 or motor to drive the HP shaft 7. The rotation number A of the HP shaft increases in proportion to that of the motor to set the engine into its self-sustained operation mode.

(b) When the rotation number of the HP shaft 7 reaches a first number such as 5,500 rpm, the starter control circuit 63 is energized by a signal indicating the rotation number from the high-pressure shaft rotation sensor 65 to cut off the power supply from the motor control circuit 62 to the rotating machine 26 or motor. At this moment, the rotation number B of the motor is 16,500 rpm which is calculated using the gear ration. Due to the motor cutoff, the rotation speed C of the outer race of the HP clutch decreases and the rotation speed A of the HP shaft increase, which causes the HP clutch 27 to run idle.

(c) The speed D of the inner race of the LP clutch increases in proportion to the rotation number B of the motor, from the start of the engine to when the rotation number reaches 4,000 rpm (motor cutoff), because of the gear ratios as described in the description 9 and the fact that the transmission 25 is fixed to be Lo-mode. Then, similar to other shafts, the speed D decreases rapidly due to the motor cutoff.

(d) The rotation number E of the LP shaft, which is directly connected to the fan, increases with the rotation number A of the HP shaft. When the rotation number E becomes identical to that of the inner race D of the LP clutch, namely, the rotation number of the HP shaft reaches a second number 7,500 rpm for example, the LP clutch 28 is automatically connected. Then, the low-pressure shaft 22 begins to drive the rotating machine 26 through the transmission 25. The rotation number C of the outer race of HP clutch is considerably lower than the rotation number A of the HP shaft, which causes the HP clutch 27 to run idle.

(e) When the engine takes the ground idle position, the rotation number A of the HP shaft stands still (at 9,000 rpm), similar to other shafts.

(f) Then, the traction drive control 50 is so energized that the rotation number of the rotating machine 26 in FIG. 2 is set to be constant, for example, 2,400 rpm. The transmission 25 controls so that the rotation number B of the generator (rotating machine) takes a constant value during which the rotation number E of the LP shaft ranges 4,000 rpm to 20,000 rpm. The rotating machine 26, which is a 2-pole motor, generates electric power with a frequency of 400 Hz. In accordance with this, the rotation number C of the outer race of the HP clutch increases up to 8,000 rpm, which is less than the ground idle rotation number of the HP shaft and therefore the HP clutch 27 remains idle.

(g) When entered the take-off operation, the rotation number E of the LP shaft increases up to 20,000 rpm, which is still within the speed control range of the transmission 25 and therefore the rotation number B of the rotating machine or the generator is maintained constant, i.e., 24,000 rpm. Although the rotation number A of the HP shaft increases up to 15,000 rpm, the rotation number C of the outer race is maintained constant, i.e., 8,000 rpm according to the rotation number B of the rotating machine, which maintains the HP clutch in the idling state.

In emergency, the transmission 25 is fixed in the Lo-mode by the control 50 to keep the rotation number thereof minimum for the sake of safety.

Figure 7:
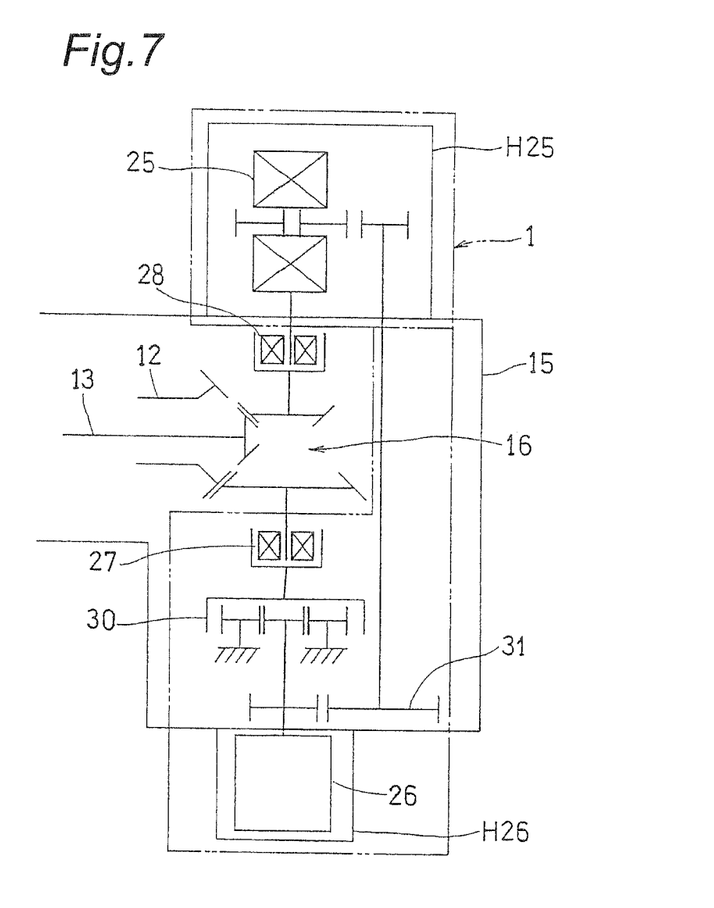
FIG. 7 is a schematic cross sectional view of the aircraft starter generator according to the second embodiment.

As shown in FIG. 7, illustrating a second embodiment of the invention, the clutches 27 and 28 and the gear trains 30 and 31 may be positioned inside the engine accessory gearbox 15 and the transmission 25 and the rotating machine 26 may be positioned outside the gearbox 15 but inside the transmission and motor housings H25 and H26, respectively, connected to the gearbox 15.

Figure 8:
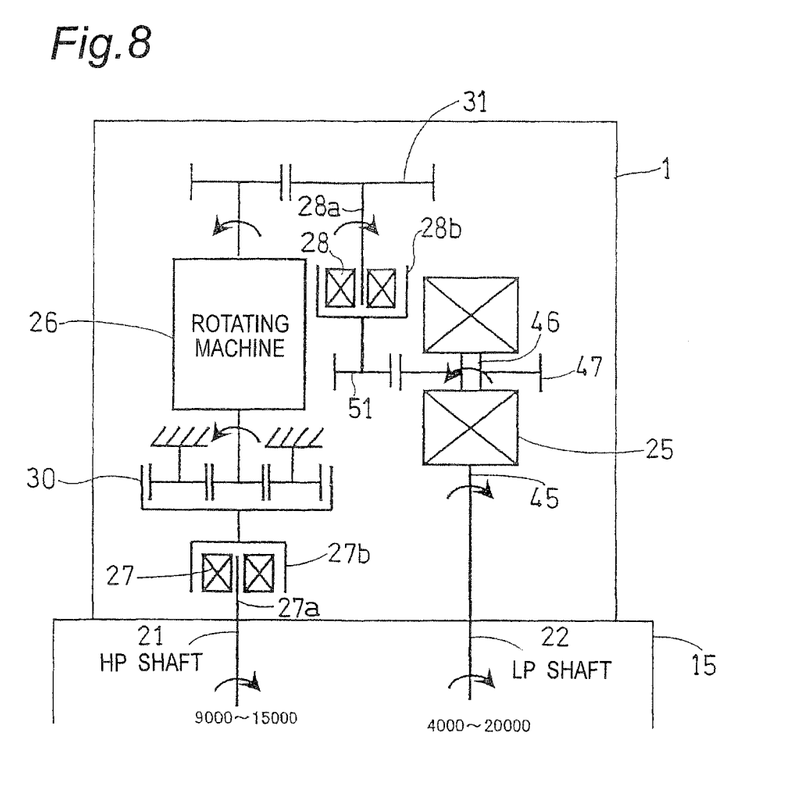
FIG. 8 is a schematic cross sectional view of the aircraft starter generator according to the third embodiment.

Also, as shown in FIG. 8 illustrating a third embodiment of the invention, the LP clutch 28 may be positioned between the idler gear train 31 and the transmission 25 (in particular, the intermediate gear 51). In this embodiment, the inner race 28a of the LP clutch 28 is connected to the idler gear train 31 and the outer race 28b is connected to the intermediate gear 51.

Figure 9:
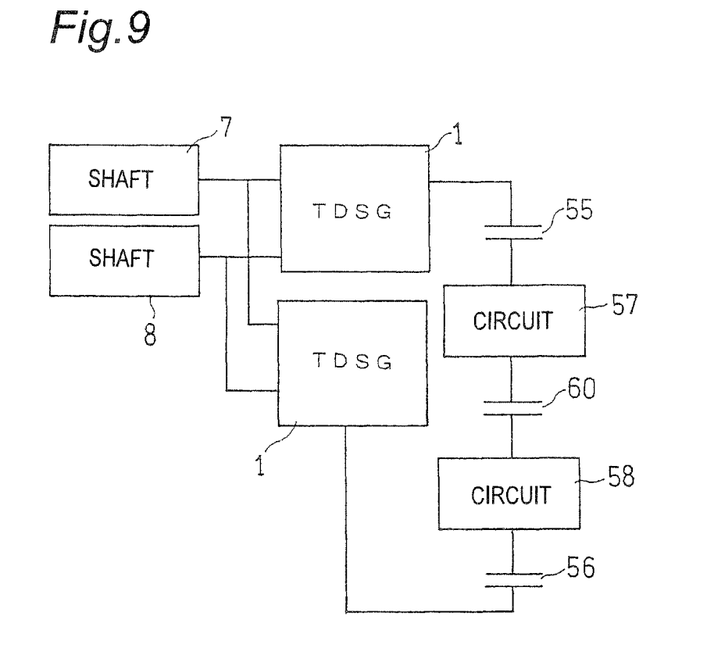
FIG. 9 is a block diagram of the aircraft starter generator according to the forth embodiment.

Further, as shown in FIG. 9 illustrating a forth embodiment of the invention, a plurality of, for example, two, starter generators (TDSG) 1 may be provided for generating more electrical energy. In this instance, the electrical energy generated by the starter generators 1 is transmitted through contactors 55 and 56 to circuits 57 and 58. A breaker 60 is connected between the circuits 57 and 58 where an electric current with a constant frequency flows. The system can be changed by controlling (i.e., closing and opening) the contactors 55 and 56, depending upon electric power needed, between a first state in which the electric power is supplied one of two starter generators 1 and a second state in which the electric power is supplied to two starter generators.

As described above, the present invention has following features:

(1) The starter generator 1, which is installed in an aircraft as an engine starter and an electric generator, has, as shown in FIG. 2, a rotating machine (motor) 26, a transmission 25 such as a traction-drive continuously variable transmission, a first clutch (high-pressure clutch) 27, and a second clutch (low-pressure clutch) 28, wherein the starter generator 1 is drivingly connected to a high-pressure drive system and a low-pressure drive system of the engine 10, so that, when starting the engine, the rotating machine drives the high-pressure drive system of the engine and, once the engine 10 enters into a self-sustained operation, the engine drives the transmission 25 through the low-pressure drive system to rotate the rotating machine 26 at a constant rotation number irrespective of an input number of rotations transmitted from the engine 10.

(2) Preferably, the starter generator has two clutches 27 and 28, a speed-up gear train 30, and an idler gear 31 in order to effectively operate the starter generator. The clutches 27 and 28 are so designed that the high-pressure clutch 27 runs idle while a drive shaft 7 of the high-pressure drive system is rotating at a high-speed and the low-pressure clutch 28 runs idle while the starter generator 1 is rotating at a high speed.

(3) At the start of the engine, the control 50 sets the transmission 25 in the Lo-mode, i.e., the maximum speed-down mode.

(4) The gear ratios of the first and second gear trains 30 and 31 are determined so that the rotation number of the low-pressure shaft 8 is smaller than that of the rotating shaft of the starter generator 1, drivingly connected through the clutch 28, at the start of the engine, and the rotation number of the high-pressure shaft 7 is larger than that of the rotating shaft of the starter generator 1, drivingly connected through the clutch 27. This results in that the fan 9 does not rotate at the start of the engine. Also, when the engine enters into the self-sustained operation, the rotations of the rotating shaft 29 does not transmitted to the HP shaft 7.

(5) The gear train 30 and 31 are provided on opposite sides of the rotating machine 26, which allows the space around the rotating machine to be used so efficiently.

(6) The clutches 27 and 28 may be positioned within the accessory gearbox 15 (See FIG. 7.)

(7) The transmission 25 and the rotating machine 26 may be accommodated within respective housings H25 and H26.

(8) The transmission 25 may be held in Lo-mode at the emergency.

As described above, according to the invention a first operation for generating electric power with a constant frequency by driving the shaft 8 of the aircraft engine 1 shown in FIG. 2 and a second operation for staring the engine by driving the shaft 7 are performed by the use of single starter generator. This reduces the number of components to be installed on the aircraft, which simplifies the electric system of the aircraft and reduces its manufacturing cost.

Also, according to the invention, when starting the engine 10, the rotating machine 26 is driven to rotate the HP shaft 21. During this operation, the LP clutch 28, in particular inner race 28a, runs idle and no rotation is transmitted through the clutch 28 to the shaft 22. This means that the rotating machine 26 does not bear any resistance which may otherwise be received from the fan 9 connected to the shaft 22, which reduces the power necessary for staring the engine. Also, according to the invention the aircraft engine can be more electrically operated than ever before.

Further, the continuously variable transmission may be a belt-type transmission. Furthermore, instead of using one-way clutch, the both or either of the clutches 27 and 28 may be a on-off clutch such as plate clutch made of a plurality of plates.

The description of the invention is merely exemplary in nature and, thus, variations that do not depart from the gist of the invention are intended to be within the scope of the invention. Such variations are not to be regarded as a departure from the spirit and scope of the invention. For example, the present invention may be applied to a gas turbine engine used as a turbo prop engine and such modifications are still within the scope of the invention.

What is claimed is:

1. A starter generator for use with an engine, the engine having a compressor for compressing air, a combustor for combusting fuel with the air compressed by the compressor, first and second turbines adapted to be rotated by impingements of compressed combustion gases from the combustor, a first rotating shaft drivingly connected with the compressor and the first turbine so that it rotates with the compressor and the first turbine, and a second rotating shaft drivingly connected with the second turbine so that it rotates with the second turbine, comprising:

an electric rotating machine having a rotating shaft, the rotating machine being designed to carry on two reverse operations—motor and generator;

a first clutch connected between the rotating machine and the first rotating shaft for transmitting rotations of the rotating machine to the first rotating shaft;

a second clutch connected between the rotating machine and the second rotating shaft for transmitting rotations of the second rotating shaft to the rotating machine;

a continuously variable transmission for changing the number of rotations transmitted from the second rotating shaft to the rotating machine; and a control designed to carry out a first mode in which the rotating machine is supplied with electric power to rotate the rotating shaft and thereby rotations of the rotating shaft are transmitted through the first clutch to the first rotating shaft and a second mode in which, following the first mode, the number of rotations of the rotating shaft of the rotating machine is kept constant by controlling a transmission ratio of the continuously variable transmission.

2. The starter generator of claim 1, wherein the control is so designed that it disconnects the first rotating shaft from the rotating machine when the number of rotations of the first rotating shaft reaches a first rotation number and controls the continuously variable transmission to cause the rotations of the second rotating shaft to be transmitted to the rotating shaft of the rotating machine when the rotation number of the first rotating shaft reaches a second rotation number which is greater than the first rotation number.

3. The starter generator of claim 1, wherein one end of the rotating shaft of the rotating machine is connected to the first clutch through a first gear train and the other end of the rotating shaft of the rotating machine is connected to the second clutch through the continuously variable transmission.

4. The starter generator of claim 1, wherein the second clutch is connected between the continuously variable transmission and the second rotating shaft.

5. The starter generator of claim 1, wherein the second clutch is connected between the continuously variable transmission and a second gear train.

6. The starter generator of claim 3, further comprising
a housing accommodating the rotating machine, the continuously variable transmission, the first clutch, the second clutch, the first gear train, and a second gear train; and
a gear box accommodating a third gear train connected to the first and second rotating shafts.

7. The starter generator of claim 3, further comprising
a gear box accommodating the first clutch, the second clutch, the first gear train, a second gear train, and a third gear train connected to the first and second rotating shafts;
a first housing accommodating the rotating machine; and
a second housing accommodating the continuously variable transmission, the first and second housings being connected to the gear box.

8. The starter generator of claim 1, wherein the first clutch is a one-way clutch.

9. The starter generator of claim 1, wherein the second clutch is a one-way clutch.

* * * * *